(12) United States Patent
Ishikawa (10) Patent No.: US 7,003,207 B2
(45) Date of Patent: Feb. 21, 2006

(54) OPTICAL WAVEGUIDE DEVICE

(75) Inventor: Yoshihiro Ishikawa, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/919,629

(22) Filed: Aug. 17, 2004

(65) Prior Publication Data

US 2005/0117865 A1    Jun. 2, 2005

(30) Foreign Application Priority Data

Nov. 27, 2003   (JP)   .............................. 2003-397471

(51) Int. Cl.
 *G02B 6/10*  (2006.01)
(52) U.S. Cl. .................................... 385/129
(58) Field of Classification Search ........ 385/129–132, 385/14, 146
See application file for complete search history.

(56) References Cited

U.S. PATENT DOCUMENTS

| | | | |
|---|---|---|---|
| 5,139,904 A * | 8/1992 | Auda et al. ..................... | 430/30 |
| 5,511,142 A * | 4/1996 | Horie et al. .................. | 385/129 |
| 5,838,869 A * | 11/1998 | Rasch et al. ................. | 385/132 |
| 2003/0026569 A1 | 2/2003 | Beeson et al. | |
| 2003/0156813 A1 * | 8/2003 | Terakawa et al. ........... | 385/129 |
| 2004/0120458 A1 * | 6/2004 | Dierichs et al. .............. | 378/92 |

FOREIGN PATENT DOCUMENTS

| | | |
|---|---|---|
| EP | 1336894 | 8/2003 |
| JP | 57 155507 | 9/1982 |
| JP | 07-092338 | 4/1995 |

OTHER PUBLICATIONS

Kagami M et al. "Fabrication of Large-Core, High-Optical Waveguides in Polymers" Applied Optics, Optical Society of America, Washington, US, vol. 34, No. 6, Feb. 20, 1995, pp. 1041-1046, XP000490005 ISSN: 0003-6935.

* cited by examiner

*Primary Examiner*—Rodney Bovernick
*Assistant Examiner*—Mike Stahl
(74) *Attorney, Agent, or Firm*—Ladas & Parry LLP (57) ABSTRACT

An optical waveguide device is disclosed that includes a lower clad layer of a polymer resin material formed on a substrate, a core of a polymer resin material formed on the lower clad layer, and an upper clad layer of a polymer resin material covering the core. The core surrounded by the lower and upper clad layers forms an optical waveguide. The core has first and second opposing surfaces, the first surface facing the lower clad layer and the second surface facing away from the lower clad layer. The core is shaped so that the width of the first surface is greater than the width of the second surface in a cross section of the core.

4 Claims, 12 Drawing Sheets

OPTICAL WAVEGUIDE DEVICE

BACKGROUND OF THE INVENTION

1. Field of the Invention

The present invention relates generally to optical waveguide devices, and more particularly to an optical waveguide device having an optical waveguide of a polymer resin material formed using lamination and photolithography.

2. Description of the Related Art

Branch optical waveguide devices with a branch optical waveguide using a polymer resin material have lower light propagation characteristics, but have the advantages of far better productivity and far lower manufacturing costs than quartz branch optical waveguide devices. Accordingly, branch optical waveguide devices are often used as optical module components.

For convenience of description, a description is given of a process for manufacturing a branch optical waveguide device using a polymer resin material. According to actual manufacturing, multiple branch optical waveguides are formed on a silicon wafer in a matrix manner using lamination and photolithography, and the silicon wafer is scribed into pieces at the end. Here, a description is given in such a way as to form a single branch optical waveguide.

A Y-branch optical waveguide device 1 is manufactured through processes shown in FIGS. 1A through 1G. FIG. 1H shows the completed Y-branch optical waveguide device 1. In FIG. 1H, Z1-Z2, X1-X2, and Y1-Y2 indicate the directions of length, width, and thickness (height), respectively, of the Y-branch optical waveguide device 1. The Y-branch optical waveguide device 1 includes a Y-branch optical waveguide 2 made of a polymer resin material and a silicon substrate 3. The Y-branch optical waveguide 2 is formed on the upper surface of the silicon substrate 3. The Y-branch optical waveguide 2 includes a core 4 made of a polymer resin material such as a fluorinated polyimide resin and lower and upper clad layers 5 and 6 surrounding the core 4. The lower and upper clad layers 5 and 6 are also made of a-fluorinated polyimide resin. The core 4, which has a Y-letter shape, includes an entrance-side core 4a and two branch cores 4b and 4c that branch off therefrom. In FIG. 1H, the core 4 is shown with solid lines for convenience of description.

Figure 1A:
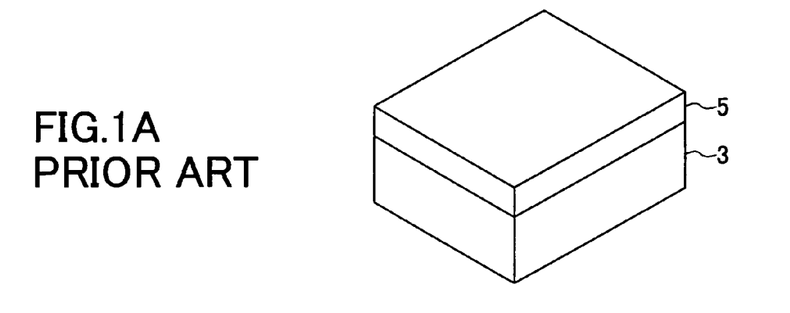
FIGS. 1A through 1H are diagrams showing a process for manufacturing a conventional Y-branch optical waveguide device.
Figure 1B:
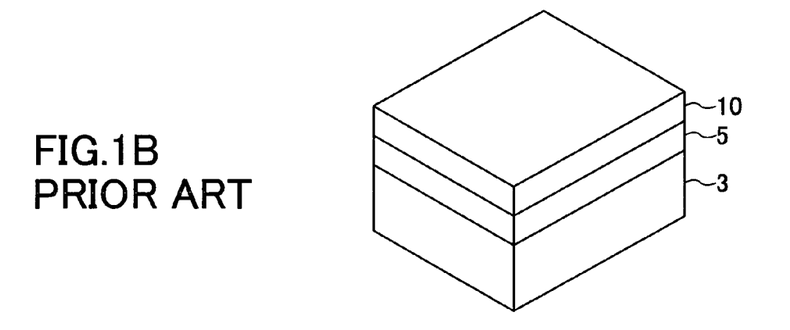
Figure 1C:
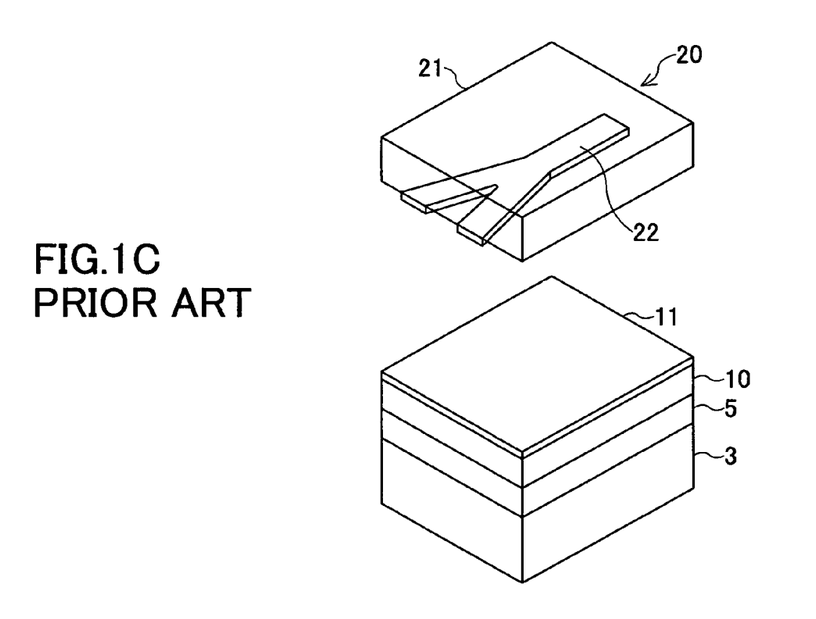
Figure 1D:
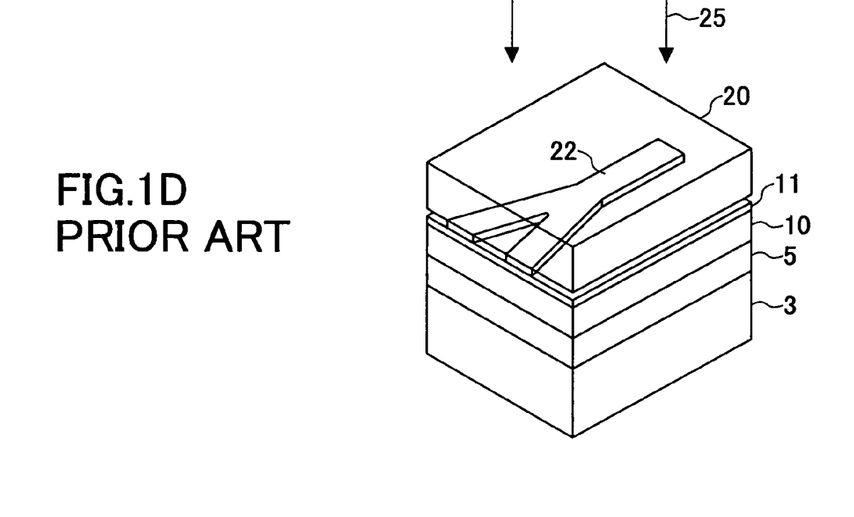
Figure 1E:
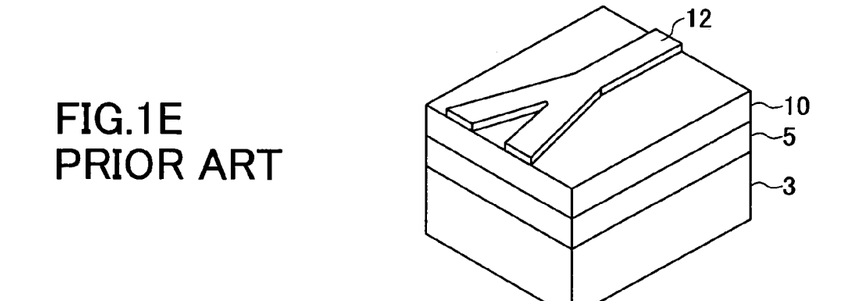
Figure 1F:
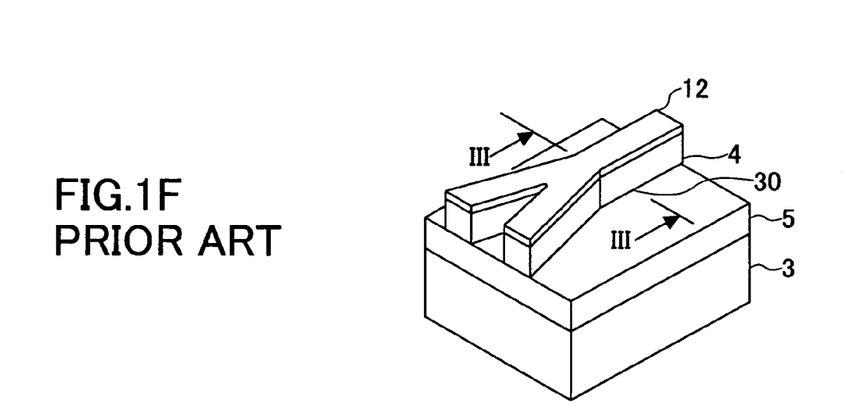
Figure 1G:
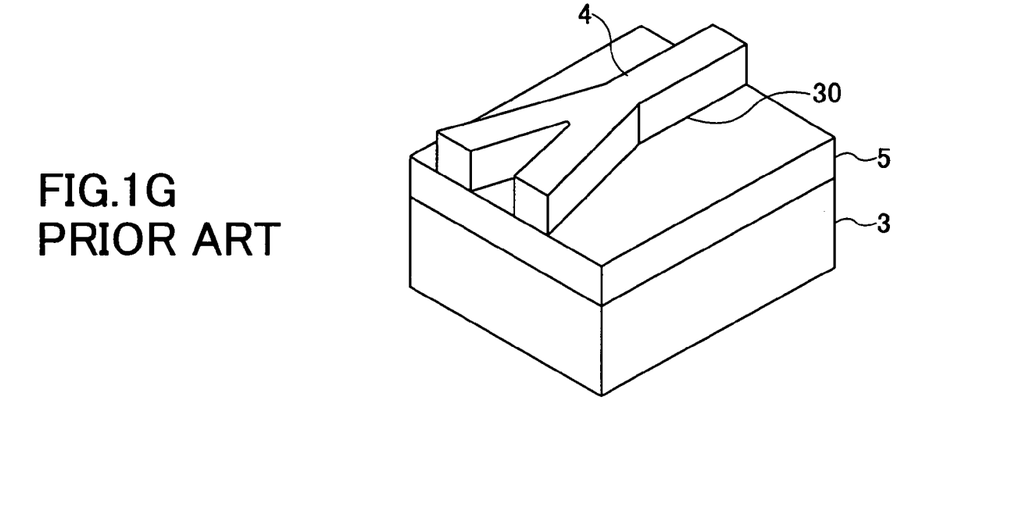
Figure 1H:
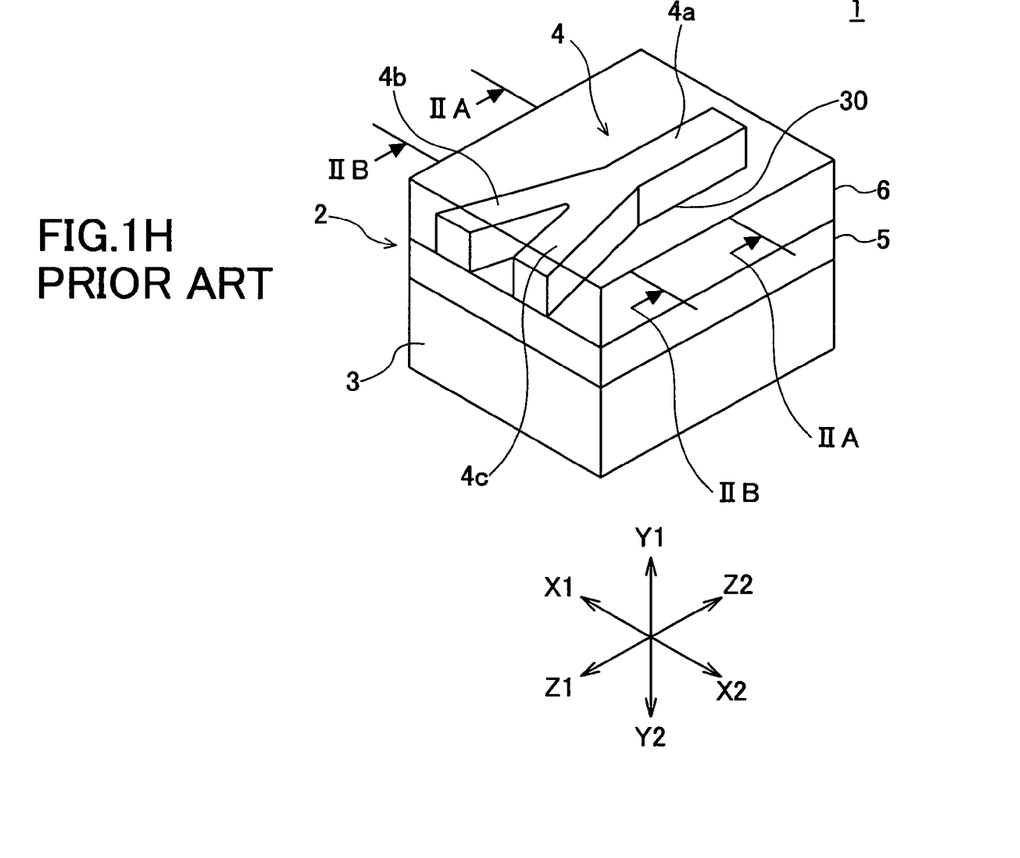

First, as shown in FIG. 1A, a fluorinated polyimide resin having a refractive index of n1 is applied on the surface of the silicon substrate 3 so that the lower clad layer 5 is formed. Then, as shown in FIG. 1B, a fluorinated polyimide resin having a refractive index of n2 (>n1) is applied on the lower clad layer 5 so that a core layer 10 is formed. Then, as shown in FIG. 1C, for instance, photoresist including silicon is applied on the core layer 10 so that a resist layer 11 is formed. A mask member 20 includes a quartz plate 21 and a Y-shaped mask pattern 22 of a chromium film formed on the lower surface of the quartz plate 21. The mask pattern 22 is shown with solid lines for convenience of description. Next, as shown in FIG. 1D, the mask member 20 is adhered onto the resist layer 11, and is exposed to ultraviolet radiation 25 so as to develop the resist layer 11. As a result, as shown in FIG. 1E, a resist mask 12 for dry etching with a reactive ion etching (RIE) apparatus is formed. Next, RIE dry etching is performed so that the Y-shaped core 4 is formed as shown in FIG. 1F. In the above-described dry etching, which is performed with oxygen pressure inside the chamber of the RIE apparatus being set to, for instance, 0.6 Pa, the core 4 is formed so that both side surfaces (the X1-side and X2-side surfaces) thereof are perpendicular to the upper surface of the silicon substrate 3. Next, as shown in FIG. 1G, the resist mask 12 is removed. Finally, a fluorinated polyimide resin having the refractive index of n1 is applied so that the upper clad layer 6 is formed to cover the core 4. As a result, the Y-branch optical waveguide device 1 shown in FIG. 1H is manufactured. Such an optical waveguide manufacturing method is disclosed in Japanese Laid-Open Patent Application No. 7-92338.

Figure 2A:
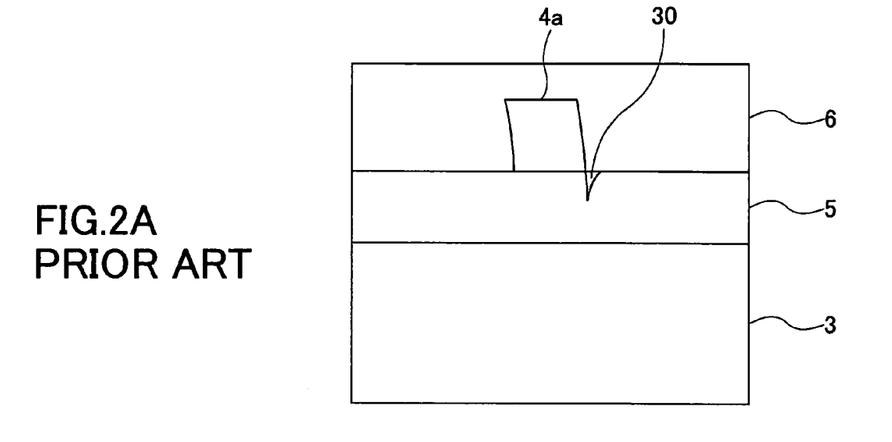
FIGS. 2A and 2B are cross-sectional views of the Y-branch optical waveguide device of FIG. 1H taken along the line IIA—IIA and the line IIB—IIB, respectively.
Figure 2B:
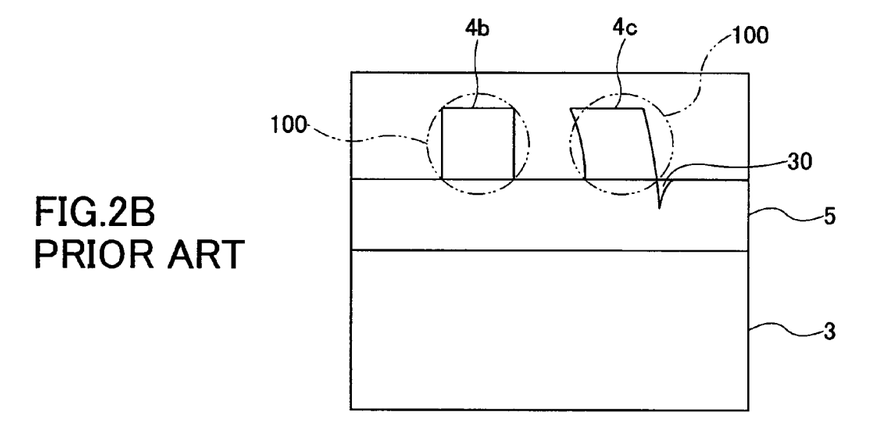

The inventor of the present invention has found that in some of the manufactured Y-branch optical waveguide devices 1, a crack 30 is formed in one or both portions of the lower clad layer 5 which portions extend along the lower edges of the side surfaces of the core 4 so that a cross section of the core 4 is distorted as shown also in FIGS. 2A and 2B. In many cases, the crack 30 was formed in a portion of the lower clad layer 5 which portion extends along part of one of the side surfaces of the core 4 near the branch point of the core 4. FIGS. 2A and 2B are cross-sectional views of the Y-branch optical waveguide device 1 of FIG. 1H taken along the line IIA—IIA and the line IIB—IIB, respectively. In FIG. 2B, optical fibers 100 are indicated by two-dot chain lines for convenience of description.

If the cross section of the core 4 is distorted, light that enters the entrance-side core 4a is prevented from being distributed evenly between the branch cores 4b and 4c, thus causing the problem of uneven branching.

Further, in a Y-branch optical waveguide device module formed by connecting optical fibers to the Y-branch optical waveguide device 1 by adhesion, the end of the core 4 (the branch core 4c) is offset with respect to the center of the end of the corresponding optical fiber 100 as shown in FIG. 2B. This causes a problem in that part of the light propagated through the branch core 4c is prevented from entering the optical fiber 100 at the connection of the Y-branch optical waveguide device 1 and the optical fiber 100, thus causing optical loss.

Figure 3:
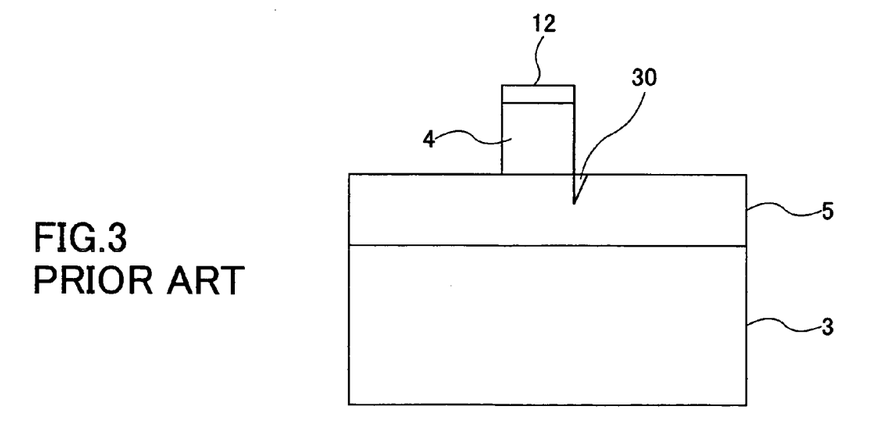
FIG. 3 is a cross-sectional view of the structure of FIG. 1F taken along the line III—III.

Further, from the observation of the structure after dry etching with the RIE apparatus shown in FIG. 1F, the inventor of the present invention has found that in some of the structures, the crack 30 is formed in one or both portions of the lower clad layer 5 corresponding to the lower edges of the side surfaces of the core 4. FIG. 3 is a cross-sectional view of the structure of FIG. 1F taken along the line III—III.

SUMMARY OF THE INVENTION

Accordingly, it is a general object of the present invention to provide a branch optical waveguide device in which the above-described disadvantage is eliminated.

A more specific object of the present invention is to provide a branch optical waveguide device in which the distortion of a core cross section is eliminated by preventing formation of a crack in a dry etching process using an RIE apparatus.

The above objects of the present invention are achieved by an optical waveguide device, including: a first clad layer on a substrate, the first clad layer being formed of a polymer resin material; a core on the first clad layer, the core being formed of a polymer resin material; and a second clad layer covering the core, the second clad layer being formed of a polymer resin material, wherein the core surrounded by the first and second clad layers forms an optical waveguide; the core has first and second opposing surfaces, the first surface facing the first clad layer and the second surface facing away from the first clad layer; and the core is shaped so that a dimension of the first surface is greater than a dimension of the second surface in a cross section of the core.

According to the present invention, the core is shaped so that the dimension of the lower surface thereof is greater than the dimension of the upper surface thereof in a cross section of the core. This prevents formation of a crack in a dry etching process with a reactive ion etching apparatus, thus preventing the cross section of the core perpendicular to the optical axis of the core from being distorted.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

Figure 4:
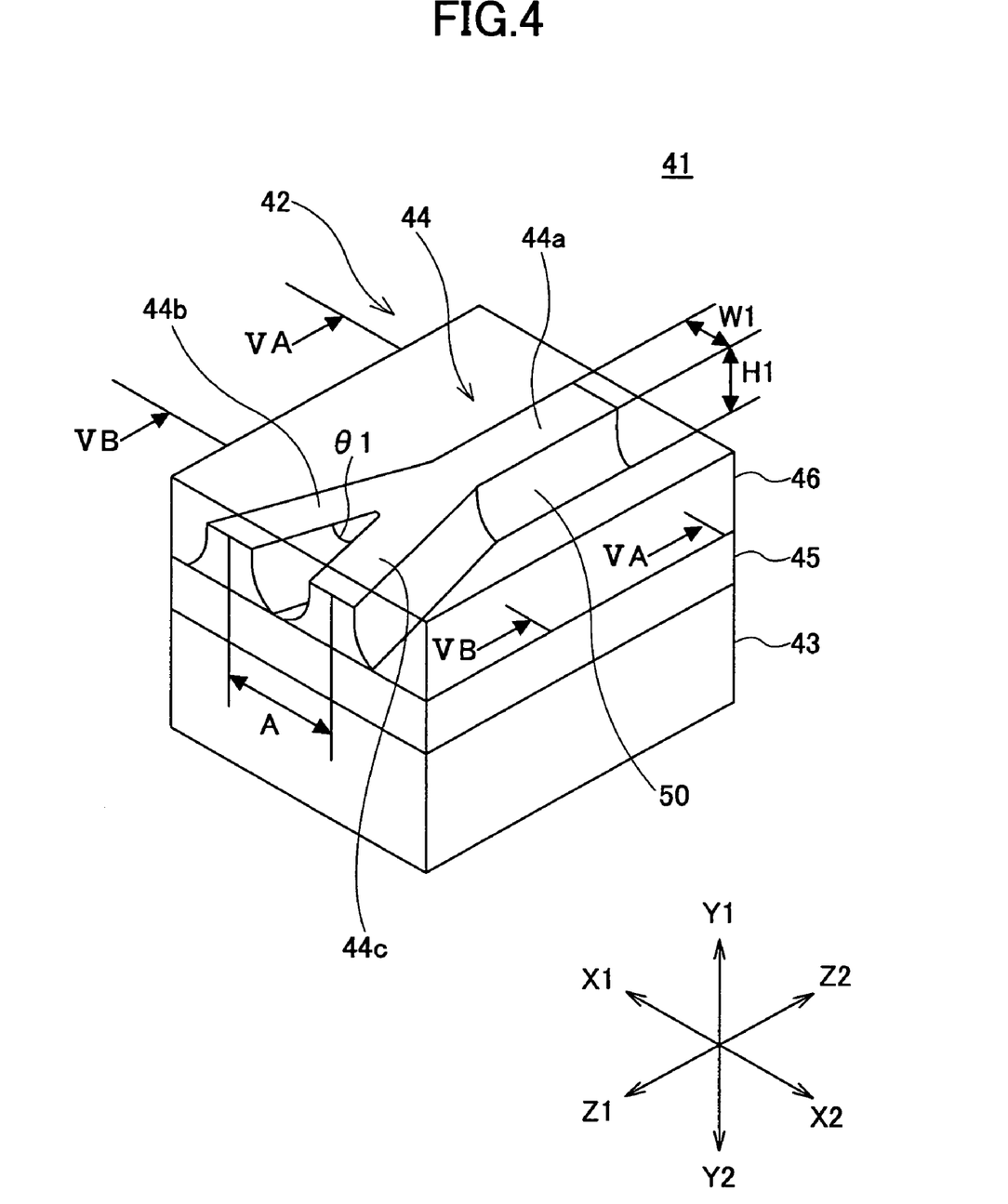
FIG. 4 is perspective view of a Y-branch optical waveguide device according to a first embodiment of the present invention.

FIG. 4 is perspective view of a Y-branch optical waveguide device 41 according to a first embodiment of the present invention. In FIG. 4, Z1-Z2, X1-X2, and Y1-Y2 indicate the directions of length, width, and thickness (height), respectively, of the Y-branch optical waveguide device 41. The Y-branch optical waveguide device 41 includes a Y-branch optical waveguide 42 made of a polymer resin material and a silicon substrate 43. The Y-branch optical waveguide 42 is formed on the upper surface of the silicon substrate 43. The Y-branch optical waveguide 42 includes a core 44 made of, for instance, a fluorinated polyimide resin having a refractive index of n2 and lower and upper clad layers 45 and 46 surrounding the core 44. The lower and upper clad layers 45 and 46 are made of a fluorinated polyimide resin having a refractive index of n1 (<n2). The core 44, which has a Y-letter shape, includes an entrance-side core 44a and two branch cores 44b and 44c that branch off therefrom. In FIG. 4, the core 44 is shown with solid lines for convenience of description. The entrance-side core 44a and the branch cores 44b and 44c are fine, each having a width W1 (FIGS. 4, 5A and 5B) of approximately 5 μm and a height H1 (FIG. 4) of approximately 5 μm, and are for a single mode. The distance A between the branch cores 44b and 44c at the Z1 end is approximately 125–250 μm, and is set to the diameter of an optical fiber. A branch angle θ1 is set to 0.5–3°, which is an angle at which light can be divided equally.

Figure 5A:
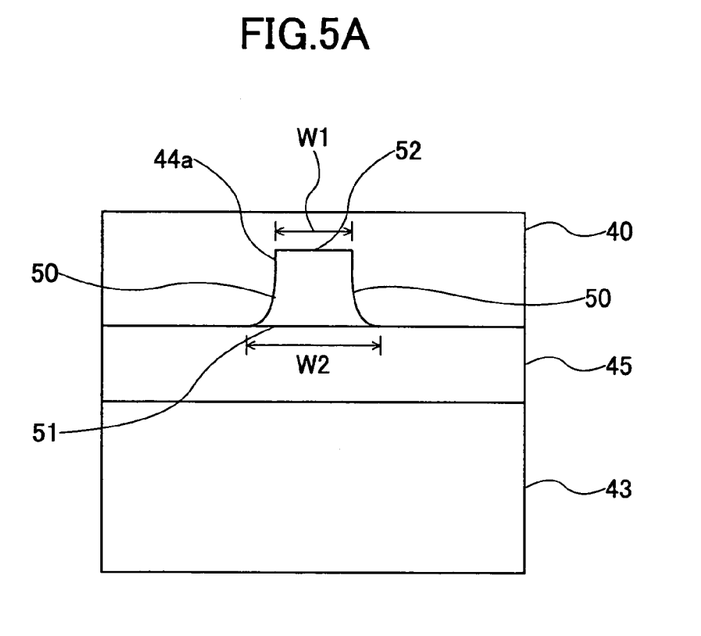
FIGS. 5A and 5B are cross-sectional views of the Y-branch optical waveguide device of FIG. 4 taken along the line VA—VA and the line VB—VB, respectively, according to the first embodiment of the present invention.
Figure 5B:
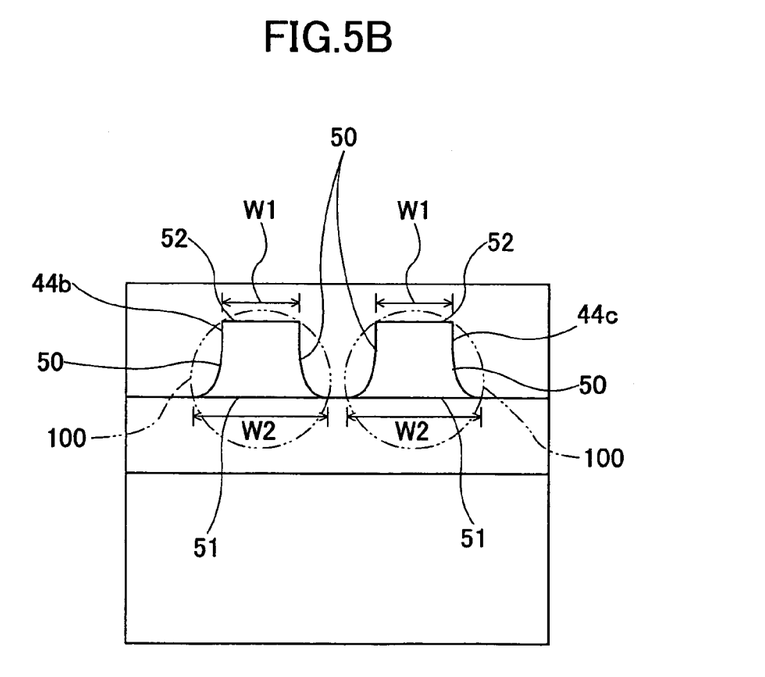

As shown in FIGS. 5A and 5B, each of the entrance-side core 44a and the branch cores 44b and 44c has a cross section having side surfaces 50 flaring at the bottom. That is, the entrance-side core 44a and the branch cores 44b and 44c are shaped so that the width W2 of their lower surface 51 is greater than the width W1 of their upper surface 52. FIGS. 5A and 5B are cross-sectional views of the Y-branch optical waveguide device 41 of FIG. 4 taken along the line VA—VA and the line VB—VB, respectively. In FIG. 5B, the optical fibers 100 are indicated by two-dot chain lines for convenience of description.

The cross section of each of the entrance-side core 44a and the branch cores 44b and 44c includes no distortion. Accordingly, light that enters the entrance-side core 44a is distributed evenly between the branch cores 44b and 44c, thus ensuring evenness of branching.

In a Y-branch optical waveguide device module formed by connecting optical fibers to the Y-branch optical waveguide device 41 by adhesion, the ends of the core 44 (the branch cores 44b and 44c) are substantially aligned with the ends of the optical fibers 100 as shown in FIG. 5B. As a result, light propagated through the branch cores 44b and 44c enters the optical fibers 100 satisfactorily. Accordingly, optical loss at the connection of the Y-branch optical waveguide device 41 and the optical fibers 100 can be prevented, thus resulting in good optical characteristics.

The Y-branch optical waveguide device 41 is manufactured through processes shown in FIGS. 6A through 6G. The processes are equal to those shown in FIGS. 1A through 1G except that a condition of the dry etching process shown in FIG. 6F using an RIE apparatus is changed.

Figure 6A:
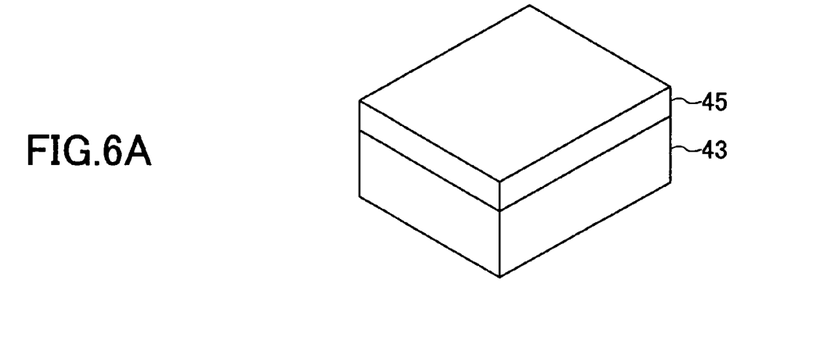
FIGS. 6A through 6G are diagrams showing a process for manufacturing the Y-branch optical waveguide device according to the first embodiment of the present invention.
Figure 6B:
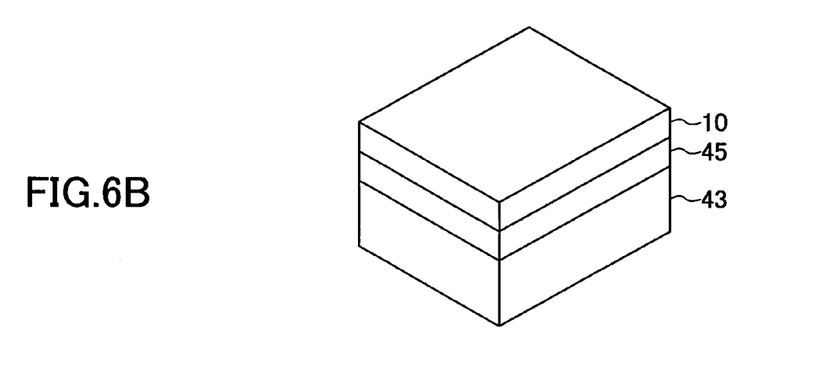
Figure 6C:
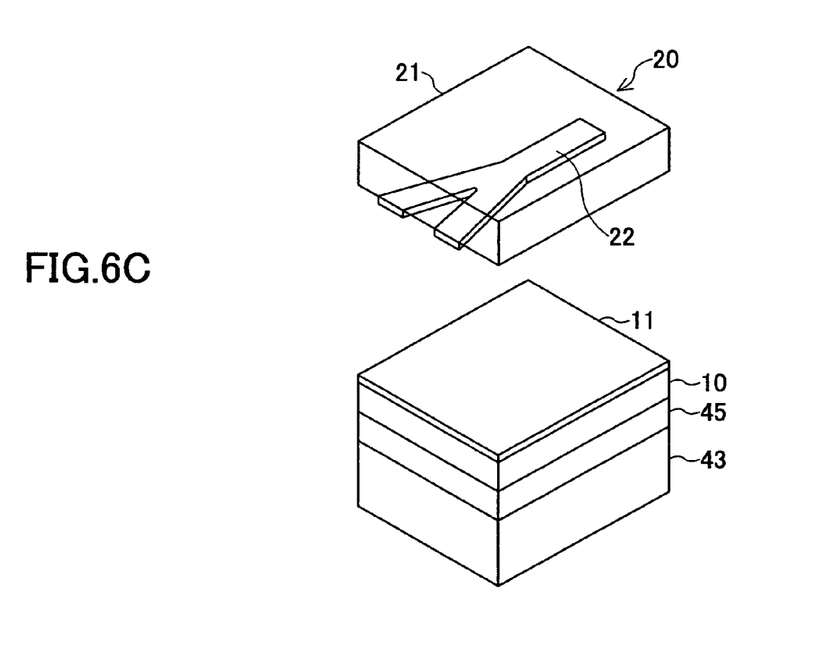
Figure 6D:
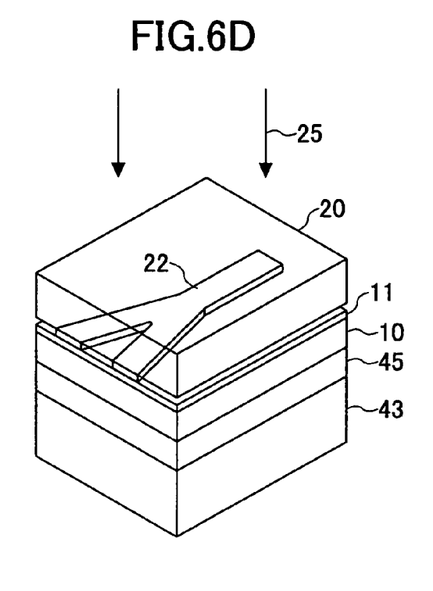
Figure 6E:
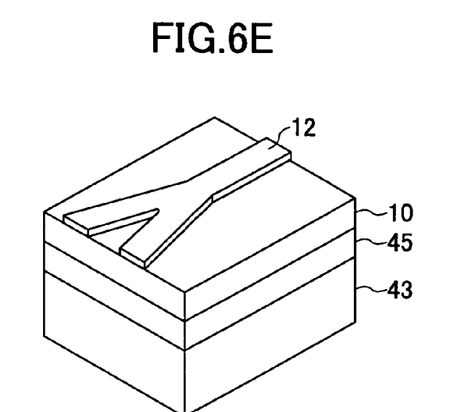
Figure 6F:
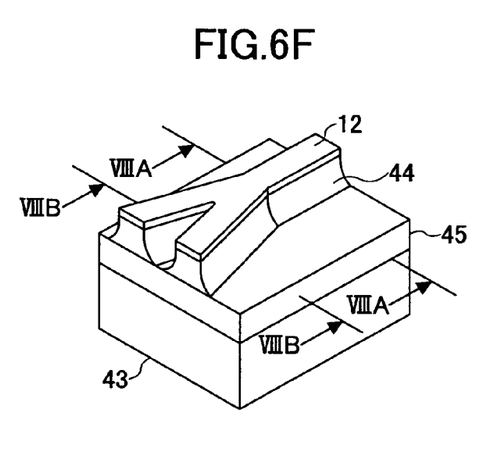
Figure 6G:
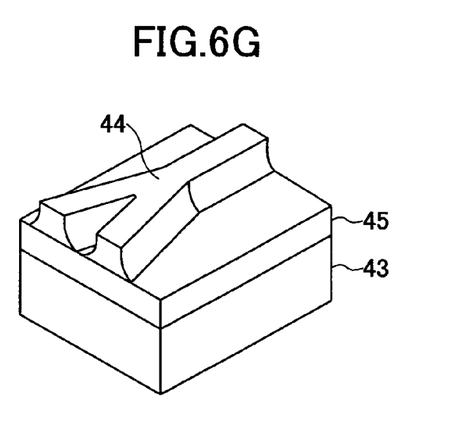
Figure 7:
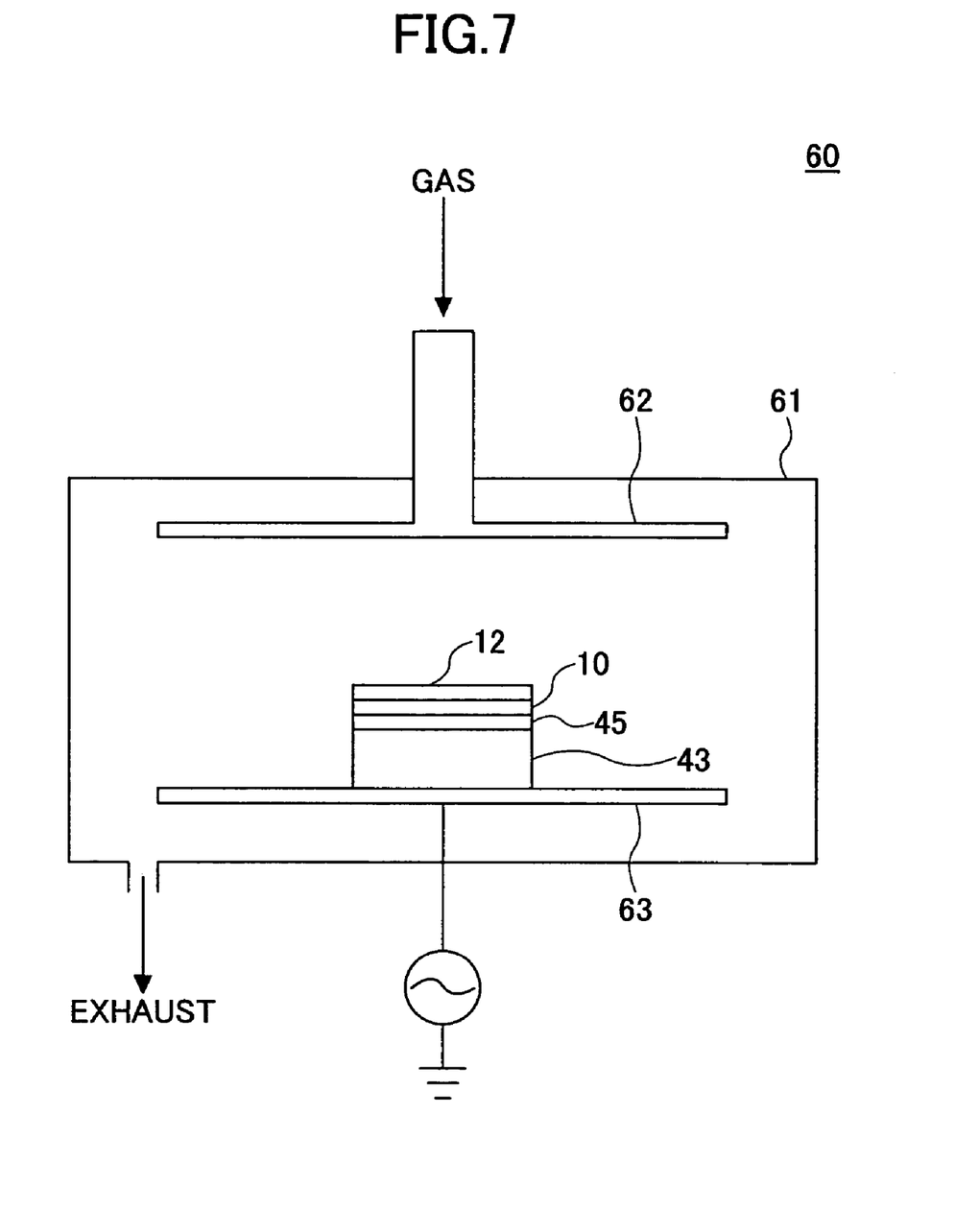
FIG. 7 is a schematic diagram showing a reactive ion etching (RIE) apparatus according to the first embodiment of the present invention.
Figure 8A:
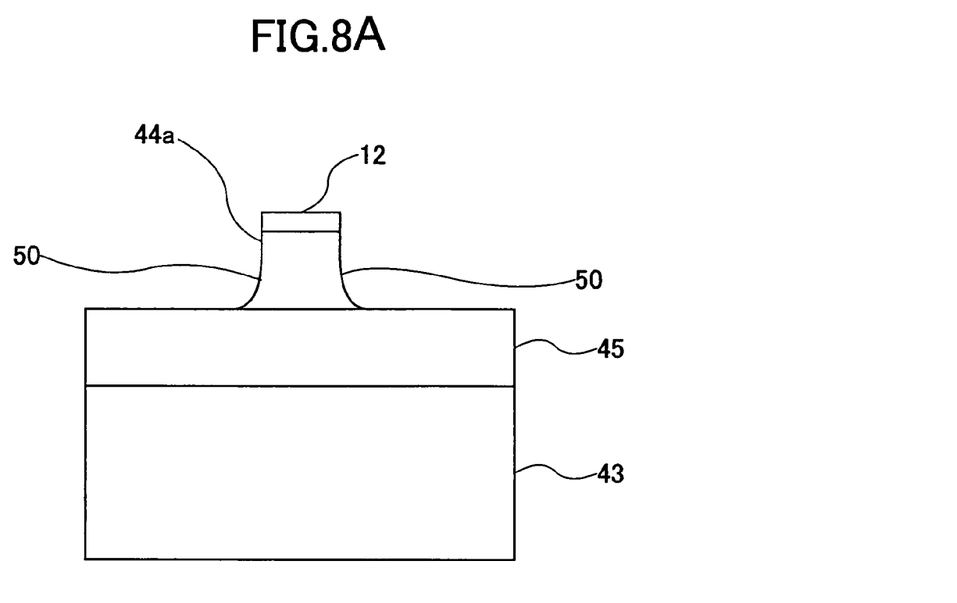
FIGS. 8A and 8B are cross-sectional views of the structure of FIG. 6F taken along the line VIIIA—VIIIA and the line VIIIB—VIIIB, respectively, according to the first embodiment of the present invention.
Figure 8B:
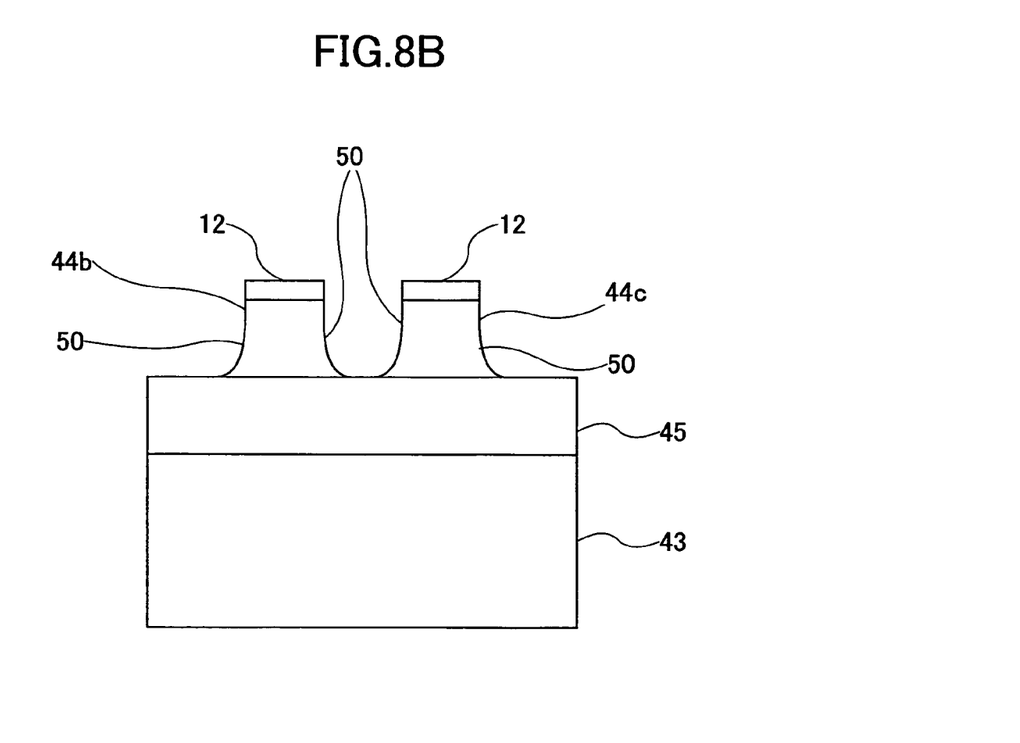

The RIE process shown in FIG. 6F was performed with oxygen pressure inside a chamber 61 of an RIE apparatus 60 shown in FIG. 7 being set to a value causing the reactive ion etching to be isotropic etching, for instance, 5 Pa, which is approximately 10 times its normal value of 0.6 Pa. Thereby, the inventor of the present invention confirmed that as shown in FIGS. 8A and 8B, the core layer 10 is removed and the core 44 having the side surfaces 50 flaring at the bottom is formed. The RIE apparatus 60 includes an upper electrode 62 and a lower electrode 63. FIGS. 8A and 8B are cross-sectional views of the structure of FIG. 6F taken along the line VIIIA—VIIIA and the line VIIIB—VIIIB, respectively. The inventor of the present invention observed each core on the wafer after the RIE process, and confirmed that no crack is formed in the portions of the lower clad layer 45 which portions oppose the lower edges of the side surfaces 50 of the entrance-side core 44a and the branch cores 44b and 44c.

Further, the inventor of the present invention observed the completed Y-branch optical waveguide devices 41, and confirmed that none of the entrance-side core 44a and the branch cores 44b and 44c has a distorted cross section as shown in FIGS. 2A and 2B in any of the completed Y-branch optical waveguide devices 41.

Accordingly, the Y-branch optical waveguide device 41 can be formed stably with high quality and little variation in quality through the above-described manufacturing process.

Figure 9:
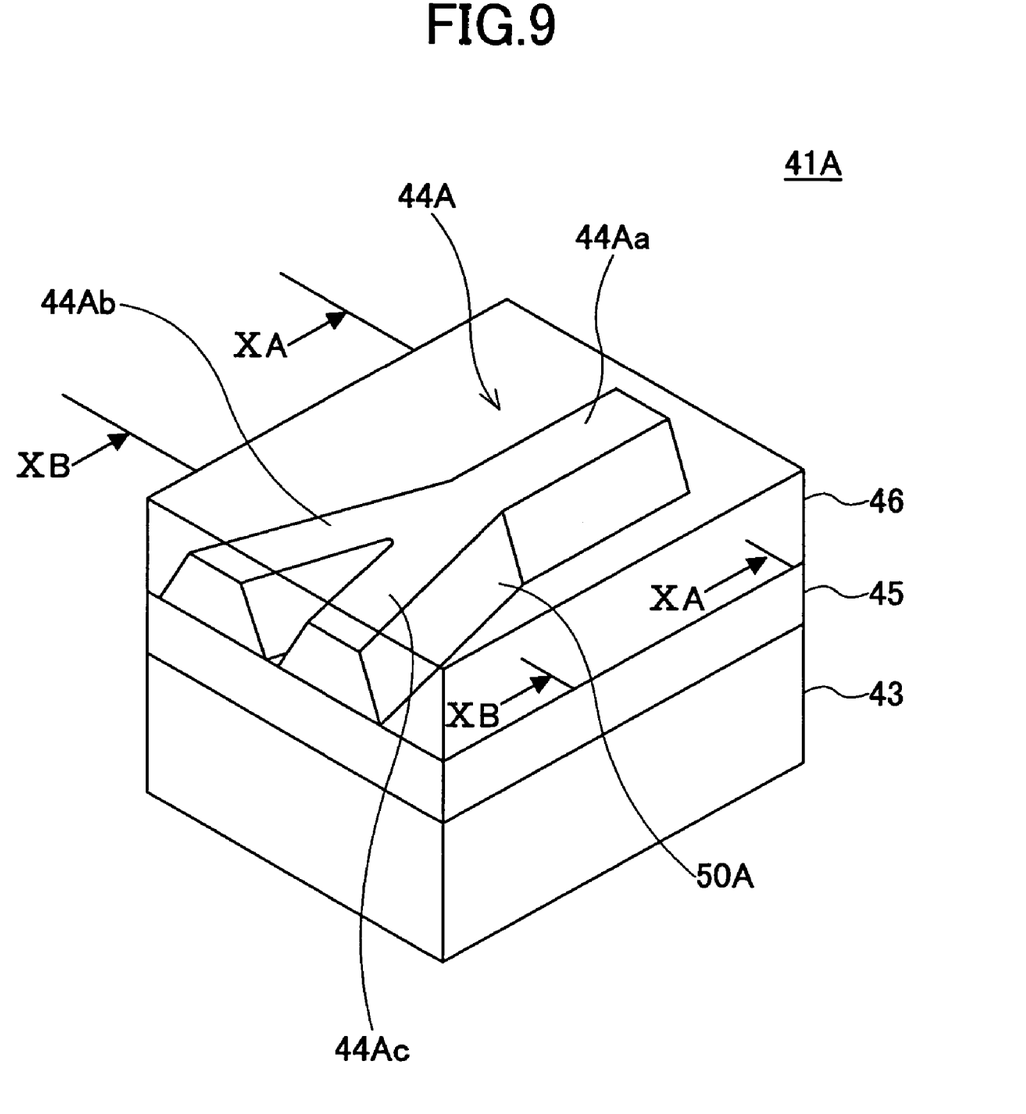
FIG. 9 is a perspective view of a Y-branch optical waveguide device according to a second embodiment of the present invention.
Figure 10A:
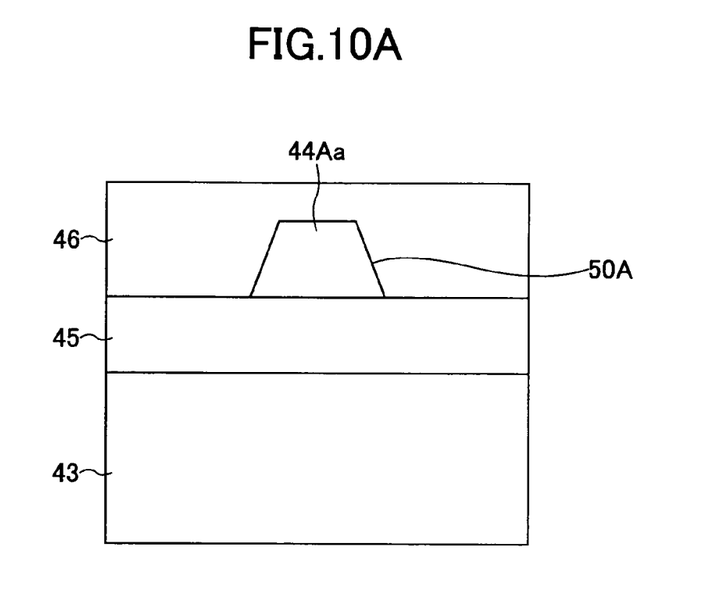
FIGS. 10A and 10B are cross-sectional views of the Y-branch optical waveguide device of FIG. 9 taken along the line XA—XA and the line XB—XB, respectively, according to the second embodiment of the present invention.
Figure 10B:
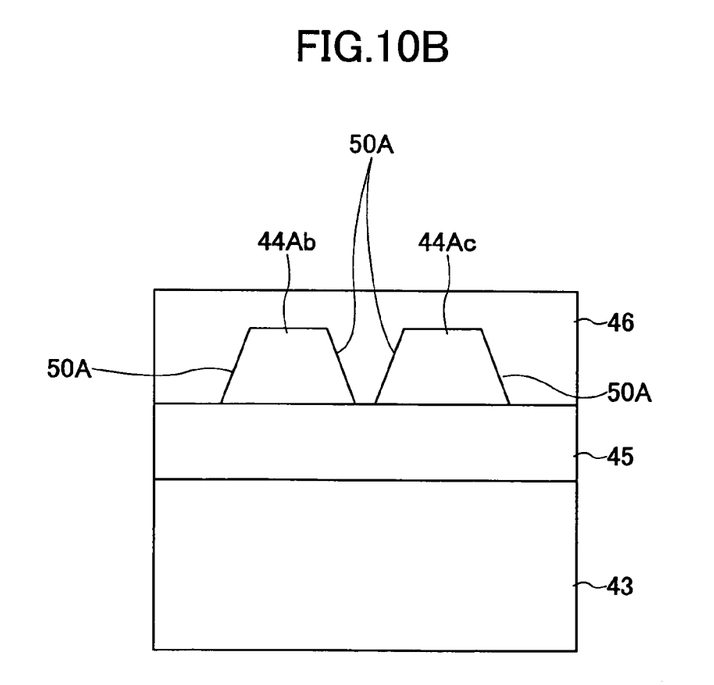

FIG. 9 is a perspective view of a Y-branch optical waveguide device 41A according to a second embodiment of the present invention. The Y-branch optical waveguide device 41A is equal to the Y-branch optical waveguide device 41 of the first embodiment except for a core 44A. Each of an entrance-side core 44Aa and two branch cores 44Ab and 44Ac that branch off therefrom has sloping side surfaces 50A so as to have a trapezoidal cross section as shown also in FIGS. 10A and 10B. The core 44A is also formed by performing RIE under a predetermined condition. In FIG. 9, the core 44A is shown with solid lines for convenience of description. FIGS. 10A and 10B are cross-sectional views of the Y-branch optical waveguide device 41A of FIG. 9 taken along the line XA—XA and the line XB—XB, respectively.

The Y-branch optical waveguide device 41A has an improved branching characteristic. In a Y-branch optical waveguide device module formed by connecting optical fibers to the Y-branch optical waveguide device 41A by adhesion, optical loss at the connection is prevented, thus resulting in improved optical characteristics.

The configuration according to the present invention, where the width of a core cross-sectional shape is greater on the lower surface side than on the upper surface side, is applicable not only to Y-branch optical waveguide devices but also to devices with an optical waveguide having a shape other than a Y-letter shape and devices with an optical waveguide with no branching function, and the same effects as described above can be produced.

According to the present invention, the core is shaped so that the dimension of the lower surface thereof is greater than the dimension of the upper surface thereof in a cross section of the core. This prevents formation of a crack in a dry etching process with a reactive ion etching apparatus, thus preventing the cross section of the core perpendicular to the optical axis of the core from being distorted.

The present invention is not limited to the specifically disclosed embodiments, and variations and modifications may be made without departing from the scope of the present invention.

The present application is based on Japanese Priority Patent Application No. 2003-397471, filed on Nov. 27, 2003, the entire contents of which are hereby incorporated by reference.

What is claimed is:

1. An optical waveguide device, comprising:
   a first clad layer on a substrate, the first clad layer being formed of a polymer resin material;
   a core on the first clad layer, the core being formed of a polymer resin material using an isotropic reactive ion etching process; and
   a second clad layer covering the core, the second clad layer being formed of a polymer resin material,
   wherein the core surrounded by the first and second clad layers forms an optical waveguide;
   the core has first and second opposing surfaces, the first surface facing the first clad layer and the second surface facing away from the first clad layer; and
   the core is shaped so that a dimension of the first surface is greater than a dimension of the second surface in a cross section of the core.

2. The optical waveguide device as claimed in claim 1, wherein the core includes third and fourth surfaces each connecting the first and second surfaces thereof, the third and fourth surfaces flaring at a bottom in the cross section of the core.

3. The optical waveguide device as claimed in claim 1, wherein the core includes third and fourth surfaces each connecting the first and second surfaces thereof, the third and fourth surfaces being sloped in the cross section of the core.

4. A method of manufacturing an optical waveguide device, comprising the steps of:
   (a) forming a first clad layer on a substrate, the first clad layer being formed of a polymer resin material;
   (b) forming a core on the first clad layer, the core being formed of a polymer resin material; and
   (c) forming a second clad layer covering the core, the second clad layer being formed of a polymer resin material,
   wherein the core surrounded by the first and second clad layers forms an optical waveguide;
   the core has first and second opposing surfaces, the first surface facing the first clad layer and the second surface facing away from the first clad layer;
   the core is shaped so that a dimension of the first surface is greater than a dimension of the second surface in a cross section of the core; and
   reactive ion etching for forming the core is preformed with an oxygen pressure inside a chamber being set to a value causing the reactive ion etching to be isotropic etching.

* * * * *